United States Patent
Kao

(10) Patent No.: US 7,460,763 B2
(45) Date of Patent: Dec. 2, 2008

(54) DATA LOADING METHOD AND CHIP

(75) Inventor: Daniel Kao, Taipei (TW)

(73) Assignee: Via Technologies, Inc., Taipei (TW)

( * ) Notice: Subject to any disclaimer, the term of this patent is extended or adjusted under 35 U.S.C. 154(b) by 766 days.

(21) Appl. No.: 11/108,200

(22) Filed: Apr. 18, 2005

(65) Prior Publication Data

US 2005/0259967 A1 Nov. 24, 2005

(30) Foreign Application Priority Data

May 10, 2004 (TW) ............................. 93113048 A

(51) Int. Cl.
*H04N 5/76* (2006.01)
(52) U.S. Cl. .......................................... 386/69; 386/70
(58) Field of Classification Search ...................... 386/1, 386/45–46, 96, 125–126, 69–70
See application file for complete search history.

(56) References Cited

U.S. PATENT DOCUMENTS 6,308,006 B1 * 10/2001 Yamamoto et al. ............ 386/96
6,687,211 B2 * 2/2004 Sawabe et al. ............ 369/275.3

FOREIGN PATENT DOCUMENTS

| CN | 1245334 | 2/2000 |
|---|---|---|
| JP | 10-127451 | 3/1997 |
| WO | WO2004023479 | 3/2004 |

OTHER PUBLICATIONS

CN Office Action mailed Apr. 27, 2007.

* cited by examiner

*Primary Examiner*—Thai Tran
*Assistant Examiner*—Nigar Chowdhury
(74) *Attorney, Agent, or Firm*—Thomas, Kayden, Horstemeyer & Risley

(57) ABSTRACT

A data loading method is for an audio/video playback system. The method is used for playing an audio/video data stored in a storage medium. The audio/video data comprises a plurality of audio/video segments and a plurality of navigation data corresponding to the audio/video segments. The method comprises loading only a portion of a corresponding navigation data into a memory while an audio/video segment is played. The playing of the audio/video segments is controlled by the loaded part of the navigation data.

15 Claims, 7 Drawing Sheets

DATA LOADING METHOD AND CHIP

BACKGROUND

The present invention relates in general to a method for loading digital data from a storage medium, such as an optical disc.

Recently, a wide variety of optical disc format, such as CDs, VCDs, SVCDs and DVDs, have become popular. Digital versatile discs (DVDs) are the most popular because they allow selection of any audio/video segment recorded thereon. The disc player can identify the physical position of the selected audio/video segment and immediately play the selection, thus eliminating time spent searching for the desired content.

To provide playback control, a conventional DVD player must load navigation data, comprising pointers to each audio/video segment, in its entirety into data memory after an audio/video segment is selected. The navigation data comprise complete video manager information (VMGI), video title set information (VTSI), program chain information (PGCI), playback control information (PCI) and data search information (DSI).

In addition, a conventional DVD player must load all navigation data for different audio/video segments into data memory thereof. Since the amount of memory occupied by the navigation data for each individual audio/video segment is different, dynamic allocation of memory inevitably results in fragmentation of data memory space and the utilization efficiency of data memory space is therefore decreased.

SUMMARY

An embodiment of the present invention provides a data loading method for an audio/video playback system and playing audio/video data saved in a storage medium. The audio/video data comprises a plurality of audio/video segments and a plurality of navigation data corresponding to the audio/video segments. The method comprises loading only a portion of the navigation data into a memory while a corresponding audio/video segment is played. The playback of the audio/video segments is controlled by the loaded portion of the navigation data.

An embodiment of the present invention provides a chip for loading data into an audio/video playback system and playing audio/video data stored in a storage medium. The audio/video data comprises a plurality of audio/video segments and a plurality of navigation data corresponding to the audio/video segments. The chip comprises a processor, a data memory and a program memory. A portion of the loaded data is stored in the data memory storage. A program code is stored in the program memory so that the processor loads only the portion of the navigation data corresponding to the audio/video segment.

The features and advantages of embodiments of the present invention are that only the portion of the navigation data related to playback is loaded into a data memory of a DVD player. The required data memory capacity can be reduced dramatically. Additionally, the data memory will not reach capacity due to loading a large amount of data, thus, preventing potential malfunction of the DVD player. In addition, the remaining data memory can further be used as a cache memory to improve data processing efficiency in the DVD player, and in particular the efficiency of accessing different navigation data of different audio/video segments. Moreover, in embodiments of the present invention, dynamic allocation of memory can be eliminated to prevent data memory fragmentation, which results in low memory utilization. Other advantages will be readily apparent to those who skilled in the art.

BRIEF DESCRIPTION OF THE DRAWINGS

Embodiments of the present invention can be more fully understood by reading the subsequent detailed description in conjunction with the examples and references made to the accompanying drawings, wherein.

DETAILED DESCRIPTION

Figure 1:
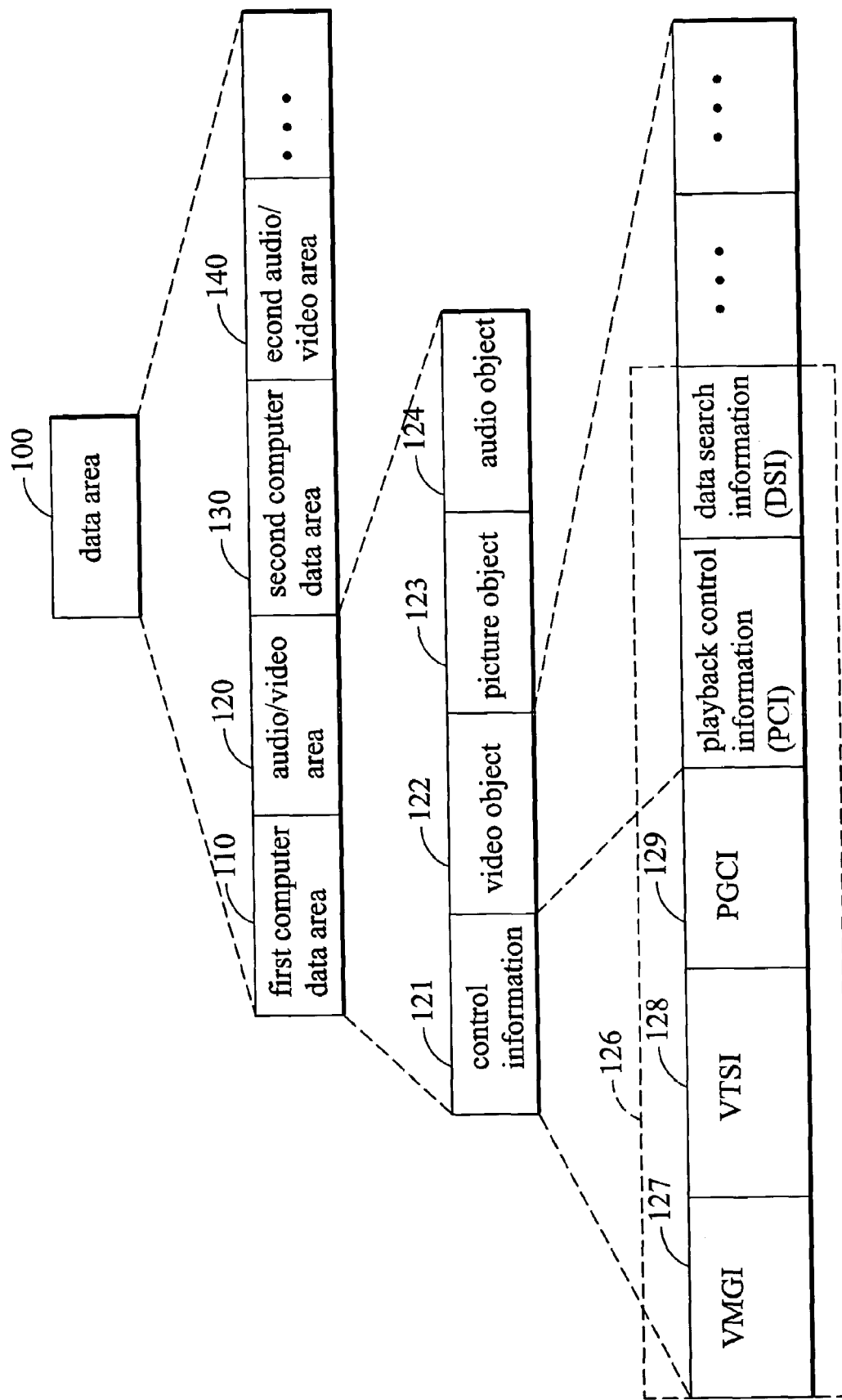
FIG. 1 is a diagram of the hierarchical data structure of a digital versatile disc.

Referring to FIG. 1, a DVD disc comprises a data area 100. The data area 100 has a hierarchical structure comprising a plurality of interlaced areas. Each interlaced area comprises a first computer data area 110, an audio/video area 120 corresponding to the first computer data area 110, a second computer area 130 and an audio/video area 140 corresponding to the second computer area 130.

The next layer under the audio/video area 120 comprises control information 121, video object 122, picture object 123 and audio object 124. Control information 121 and video object 122 comprise navigation data 126. The navigation data controls play of audio/video data, comprising at least video manager information (VMGI) 127, video title set information (VTSI) 128, program chain information (PGCI) 129, playback control information (PCI) and data search information (DSI).

Figure 2:
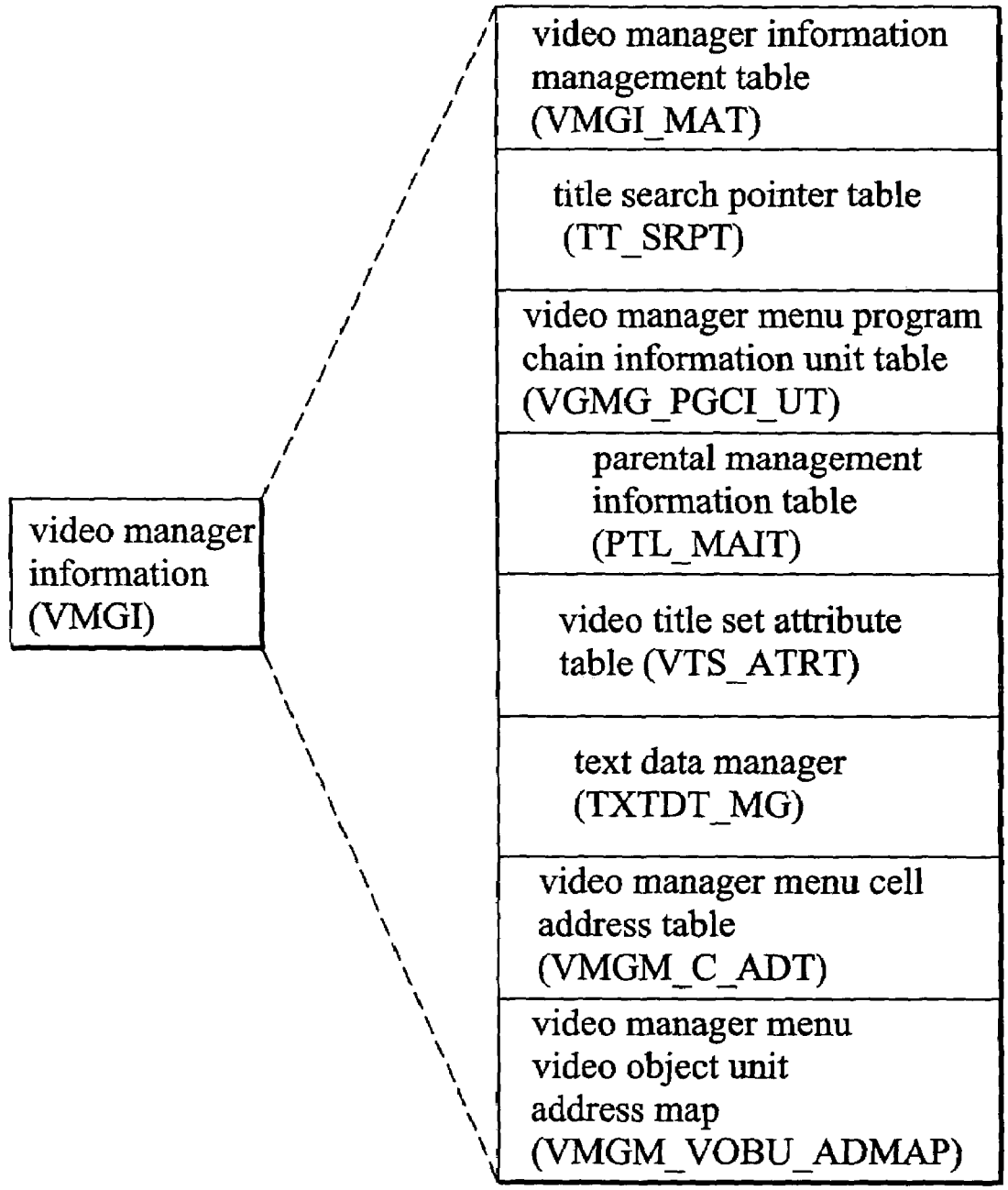
FIG. 2 is a diagram of the hierarchical data structure of video manager information.
Figure 3:
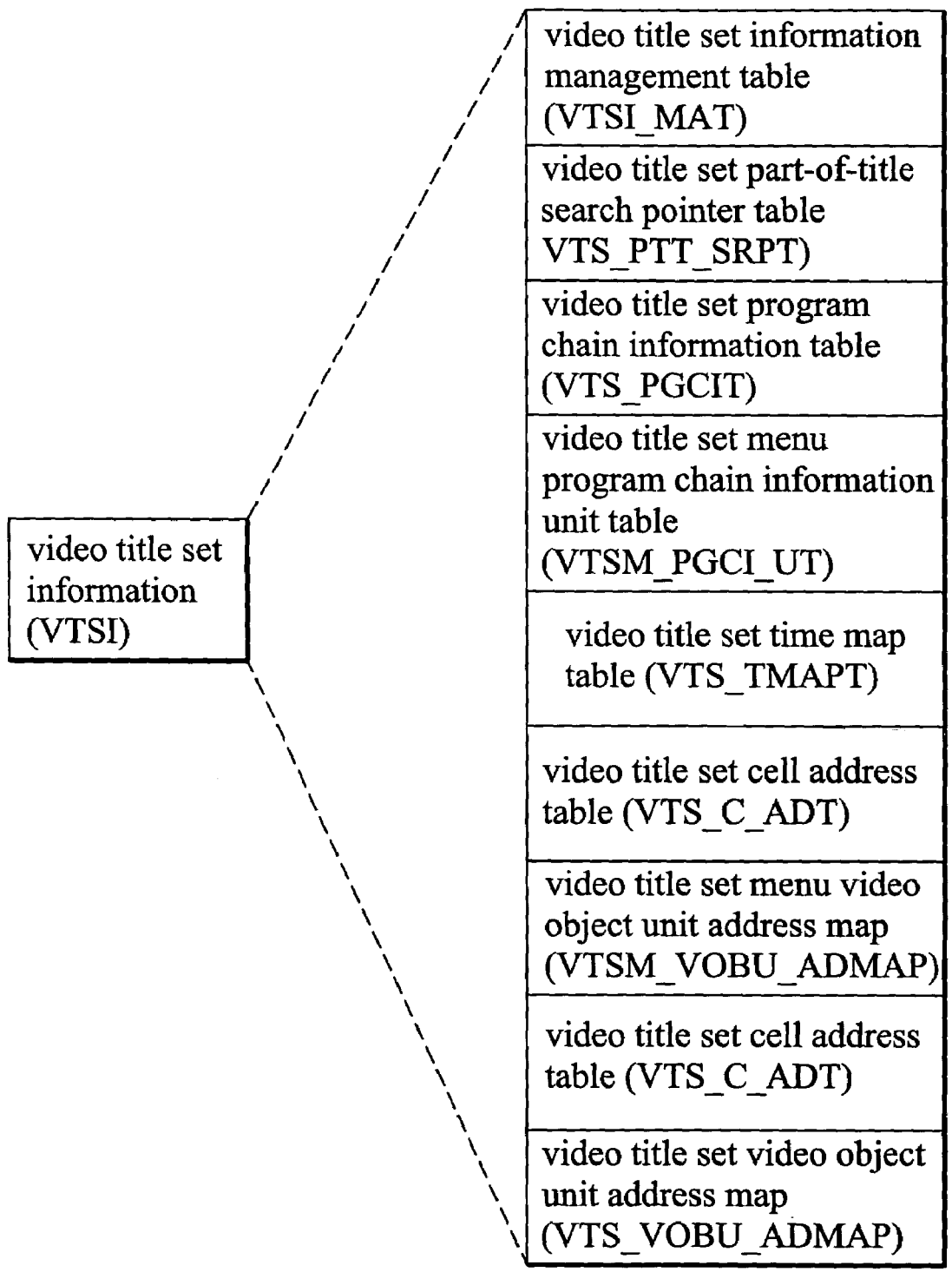
FIG. 3 is a diagram of the hierarchical data structure of video title set information.
Figure 4:
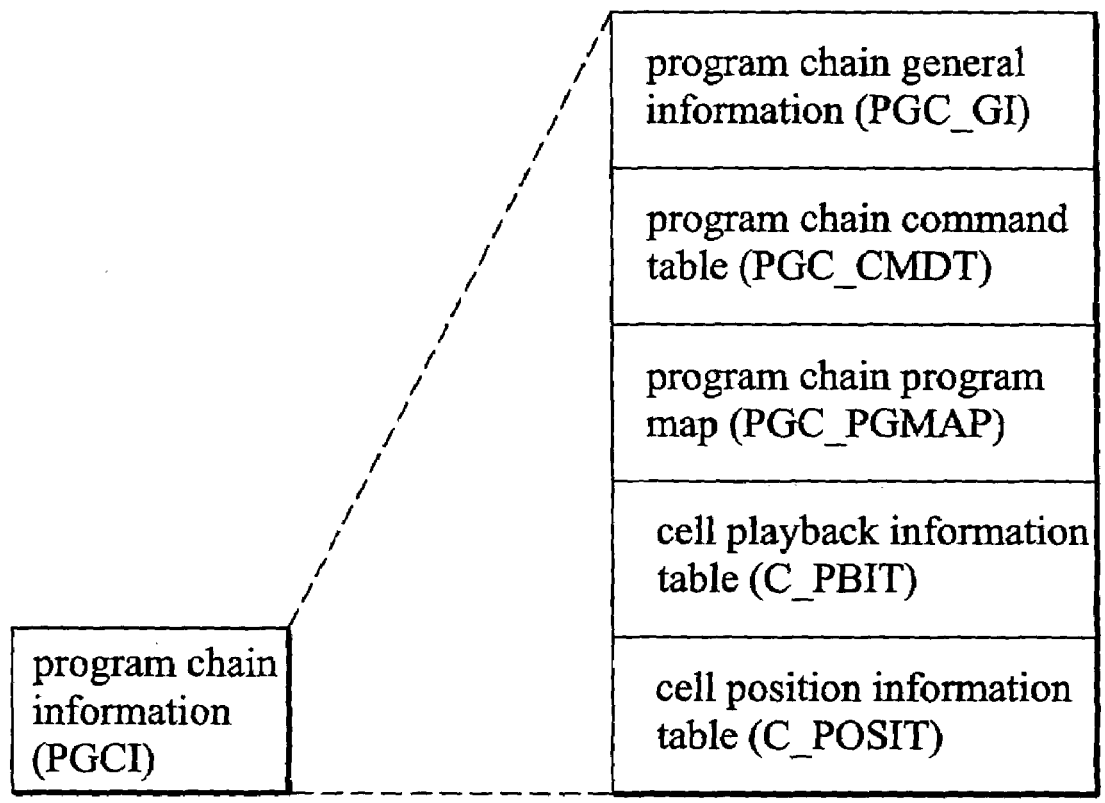
FIG. 4 is a diagram of the hierarchical data structure of program chain information.

FIGS. 2~4 are illustrations of the data structures of the complete video manager information, video title set information and program chain information. Complete video manager information comprises at least video manager information management table (VMGI_MAT), title search pointer table (TT_SRPT), video manager menu program chain information unit table (VGMG_PGCI_UT), parental management information table (PTL_MAIT), video title set attribute table (VTS_ATRT), text data manager (TXTDT_MG), video manager menu cell address table (VMGM_C_ADT) and video manager menu video object unit address map (VMGM_VOBU_ADMAP), as shown in FIG. 2. Complete video title set information comprises video title set information management table (VTSI_MAT), video title set part-of-title search pointer table VTS_PTT_SRPT), video title set program chain information table (VTS_PGCIT), video title set menu program chain information unit table (VTSM_PGCI_UT), video title set time map table (VTS_TMAPT), video title set menu video object unit address map (VTSM_VOBU_ADMAP), video title set cell address table (VTS_C_ADT) and video title set video object unit address map (VTS_VOBU_ADMAP), as shown in FIG. 3. Complete program chain information comprises program chain general information (PGC_GI), program chain command table (PGC_CMDT), program chain program map (PGC_PGMAP), cell playback information table (C_PBIT) and cell position information table (C_POSIT), as shown in FIG. 4.

Since not all information in the navigation data concerns playback control and the navigation data related to playback control has a specific format and size, depending on the type of storage medium and the format of the stored data file, an embodiment of the invention provides a method for loading data into an audio/video playback system and playing audio/video data stored in a storage medium. The audio/video data comprises a plurality of audio/video segments, such as multimedia files, and a plurality of navigation data, such as position pointers to the multimedia file and menu information of the multimedia file, corresponding to the audio/video segments. The method comprises loading only portion of the navigation data into a memory while a corresponding audio/video segment is played. For example, only a portion of the video manager information, video title set information and program chain information is loaded while the other part is not. In another example, the loaded portion of the navigation data is capable of specifying the physical position of the selected audio/video segment so that the DVD player can play the selected audio/video segment.

Figure 5:
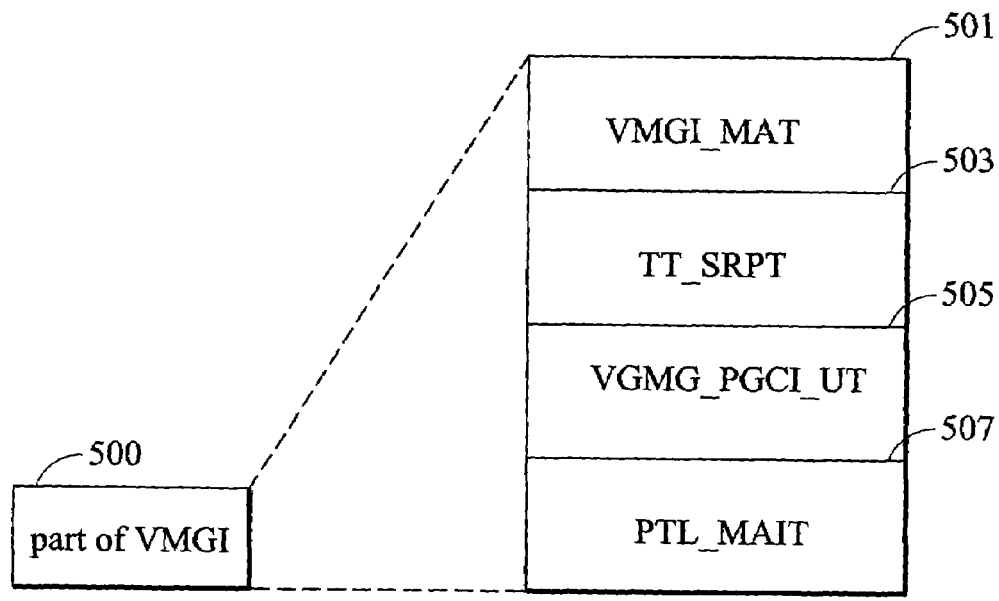
FIG. 5 is a diagram of the hierarchical data structure of a portion of the video manager information according to an embodiment of the invention.
Figure 6:
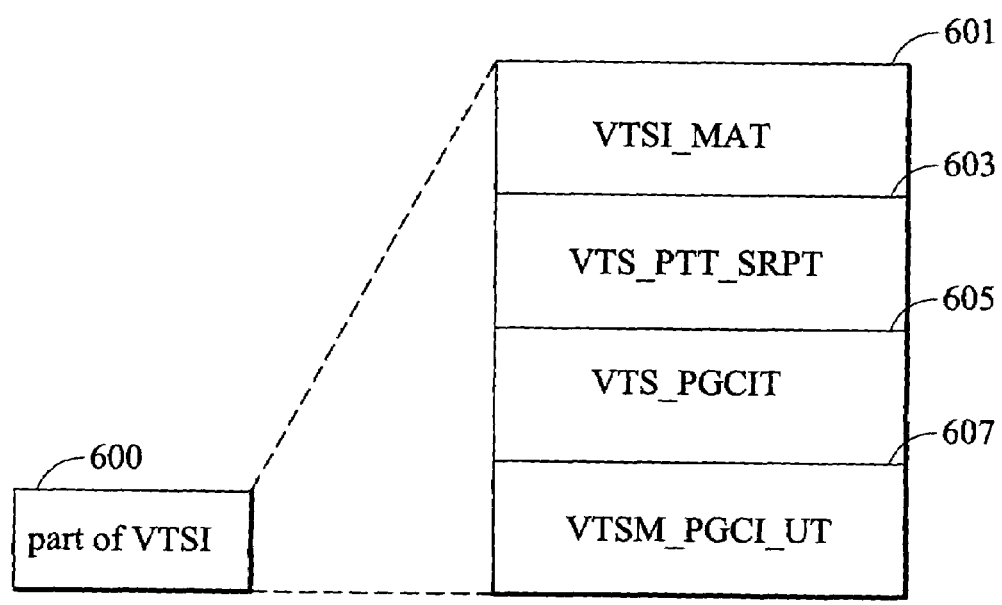
FIG. 6 is a diagram of the hierarchical data structure of a portion of the video title set information according to an embodiment of the invention.

For example, the loaded portion of the video management information 500 comprises only video manager information management table (VMGI_MAT) 501, title search pointer table (TT_SRPT) 503, video manager menu program chain information unit table (VGMG_PGCI_UT) 505, parental management information table (PTL_MAIT) 507, as shown in FIG. 5. The loaded portion of video title set information 600 comprises only video title set information management table (VTSI_MAT) 601, video title set part-of-title search pointer table (VTS_PTT_SRPT) 603, video title set program chain information table (VTS_PGCIT) 605, video title set menu program chain information unit table (VTSM_PGCI_UT) 607, as shown in FIG. 6. The loaded portion of program chain information comprises only program chain general information (PGC_GI), program chain command table (PGC_CMDT), program chain program map (PGC_PGMAP), cell playback information table (C_PBIT) and cell position information table (C_POSIT). The mentioned loaded portion of the navigation data is only one example. Without loading all of the navigation data, the loaded portion of the navigation can specify the physical position of the selected picture or audio/video segment so that the DVD player can play the selected picture or audio/video segment. Since only the portion of the navigation data related to playback control is loaded in the memory of the DVD player, the required data memory capacity can be reduced dramatically. The data memory will not reach capacity due to loading a large amount of data, thus, preventing potential malfunction of the DVD player.

Figure 7A:
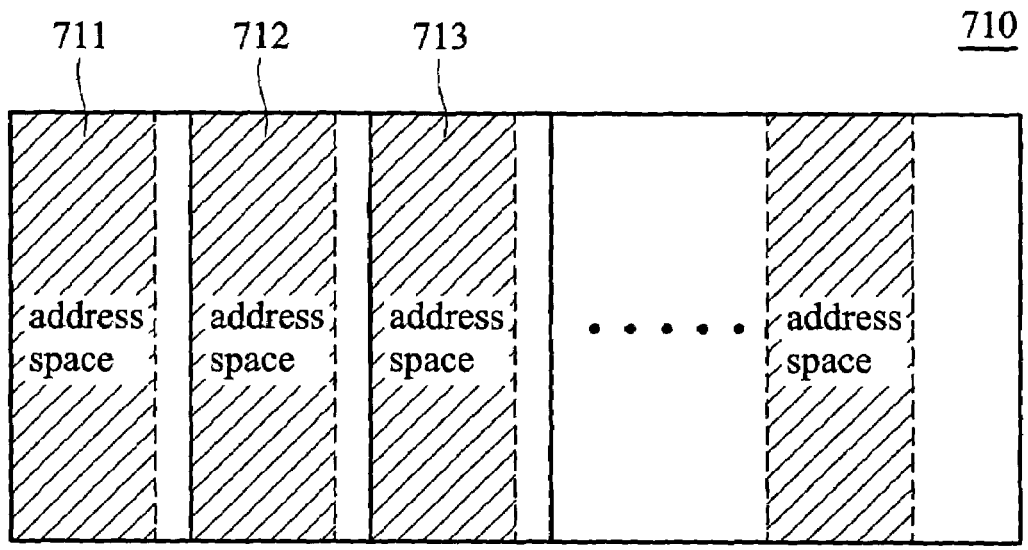
FIG. 7a is a schematic diagram of a memory subspace according to an embodiment of the invention.

In addition, according to the previously described embodiment, the maximum memory required for loading the navigation data can further be calculated, for example, according to the format of the storage medium in process. Meanwhile, a fixed memory subspace can be created, according to the sum of the required maximum memory capacity of each table, in the data memory space. The fixed memory subspace can be used for storing the loaded portion of the navigation data. As shown in FIG. 7a, in the fixed memory subspace 710, the address space for storing each table can be allocated according to the required maximum memory space of each information table. For example, if table 1, table 2, . . . , table n are to be loaded, then an address space 711 can be created according to the required maximum capacity of table 1. An address space 712 can be created according to the required maximum capacity of table 2. Other address spaces can be created according to the required maximum capacity of the corresponding table. Each table can be stored in the corresponding address space when loading the navigation data of the storage medium. As a result, the starting point of storage for each table is fixed, rather than dynamically allocated in the memory. Dynamic allocation of memory can be eliminated to prevent data memory fragmentation, which results in low memory utilization.

Figure 7B:
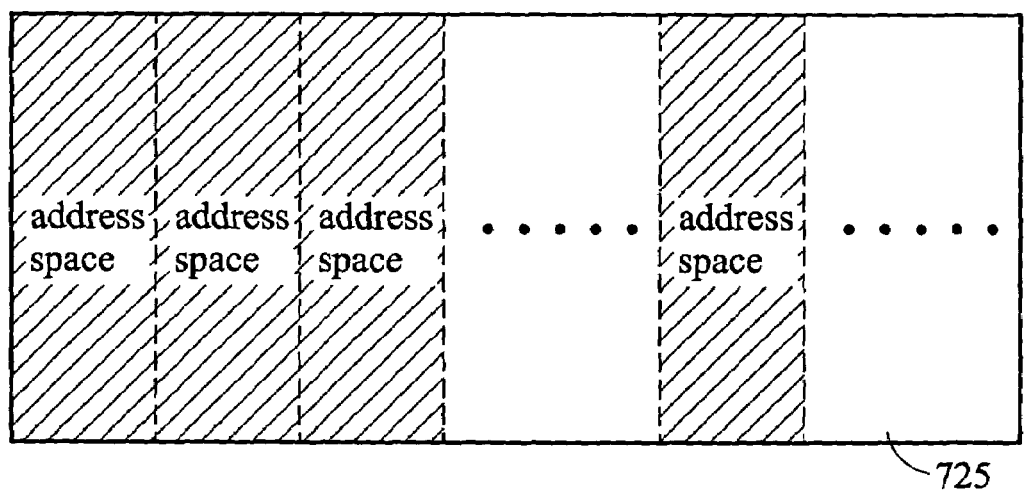
FIG. 7b is a schematic diagram of a memory subspace according to another embodiment of the invention.

As shown in FIG. 7b, in a fixed memory subspace 720, each loaded table can be continuously stored in the memory subspace. For example, if table 1, table 2, . . . , table n are to be loaded, they are stored in the memory subspace 720 continuously. Since the capacity of the created memory subspace 720 is the sum of the required maximum memory capacity of each table, part of the memory space 725 is left for cache memory which is used to fill the navigation data related to next audio/video segment until the memory subspace 720 reaches capacity. Thus, after the current segment is processed, the next segment to be processed and the related navigation data stored in the memory subspace 720 can be accessed instead of loading the corresponding data from the disc, thereby improving the data processing efficiency of the DVD player.

Figure 8:
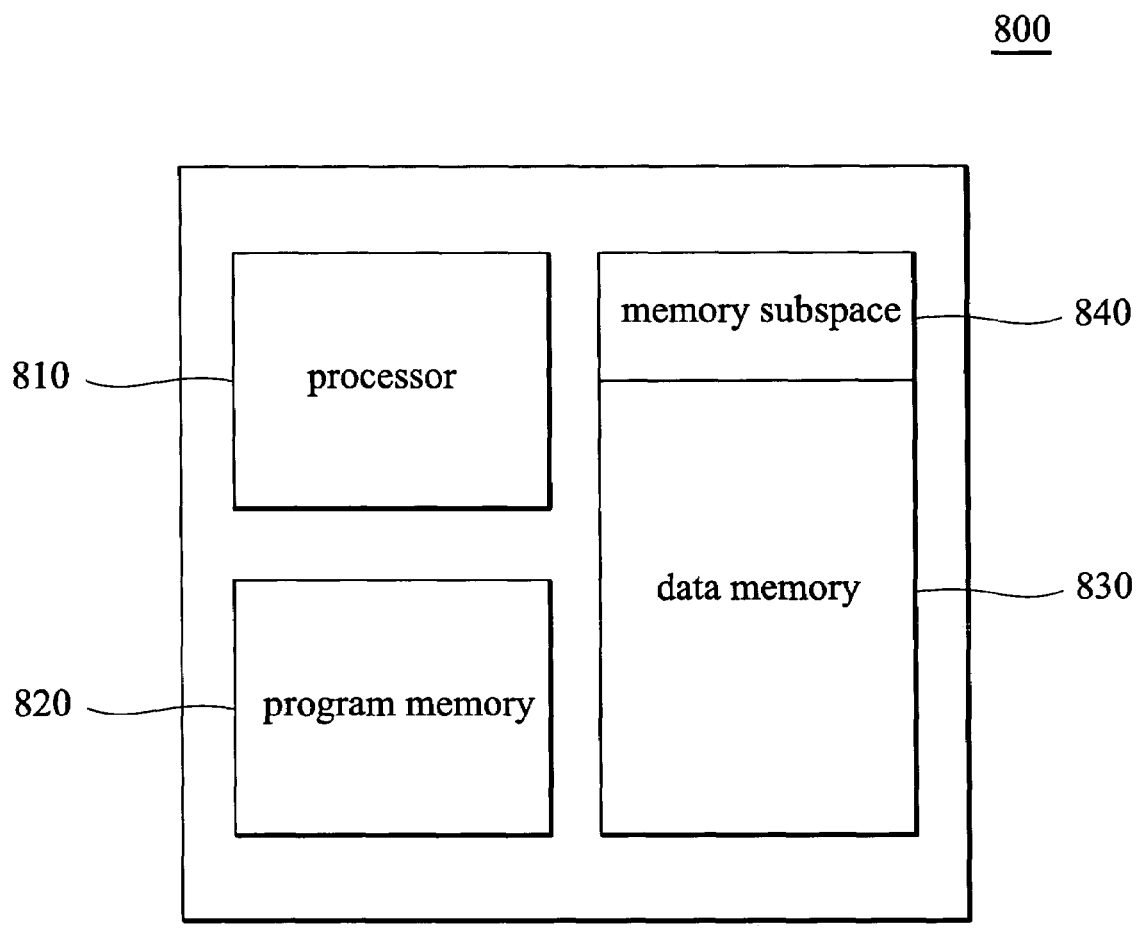
FIG. 8 is a block diagram of a chip for loading data in an audio/video playback system according to an embodiment of the invention.

Referring to FIG. 8, a second embodiment of the present invention provides a chip 800 for loading data in an audio/video playback system. The chip is used for playing a selected picture or audio/video segment. The chip 800 comprises a processor 810, a data memory 830 and a program memory 820. The data memory 830 stores a portion of the loaded data. The program memory 820 stores program codes, thus the processor 810 is only required to load the portion of the navigation data corresponding to an audio/video segment during playback thereof.

According to the second embodiment, the program code further enables the processor 810 to calculate the required maximum memory capacity for the navigation data to be loaded, for example, according to the format of the storage medium in process. Meanwhile, a fixed memory subspace 840 can be created, according to the sum of the required maximum memory capacity of each table, in the data memory space 830. The fixed memory subspace 840 stores the loaded portion of the navigation data. In the fixed memory subspace 840, the address space for storing each table can be allocated according to the required maximum memory space of each information table. Each table can be stored in the corresponding address space when loading the navigation data of the storage medium. As a result, the starting point of storage for each table is fixed, not dynamically allocated in the memory. Dynamic allocation of memory can be eliminated to prevent data memory fragmentation, which results in low memory utilization.

In addition, according to the second embodiment, the program code further enables the processor 810 to calculate the required maximum memory capacity for the navigation data to be loaded, for example, according to the format of the storage medium in process. Meanwhile, a fixed memory subspace 840 can be created, according to the sum of the required maximum memory capacity of each table, in the data memory space 830. The fixed memory subspace 840 stores the loaded portion of the navigation data. Each loaded table is stored into the fixed memory subspace 840 continuously. Since the capacity of the created memory subspace 840 is the sum of the required maximum memory capacity of each table, a portion of the memory space 830 is left for cache memory which is used to fill the navigation data related to next audio/video segment until the memory subspace 840 reaches capacity. Thus, after the current segment is processed, the next segment to be processed and the related navigation data stored in the memory subspace 830 can be accessed instead of loading the corresponding data from the disc, thereby improving the data processing efficiency of the DVD player.

Overall, a traditional DVD player plays a selected audio/video segment after the DVD player loads all the navigation data related to the audio/video segment into a data memory of the DVD player. This results in two drawbacks. The first being that the data memory resource runs out due to loading a large amount of data causing DVD player to malfunction. The second is that since the memory space occupied by the navigation data of each audio/video segment is different, dynamic allocation of memory inevitably brings about fragmentation of data memory space. In the method and chip provided according to embodiments of the present invention, however, only portion of the navigation data related to playback is loaded into a data memory of a DVD player. The required data memory capacity can be reduced dramatically. The data memory resource does not reach capacity due to loading a large amount of data, thus, preventing potential malfunction of the DVD player. In addition, the remained data memory resource can further be used as cache memory to improve the data processing efficiency of the DVD player. Moreover, in embodiments of the present invention, dynamic allocation of memory space can be avoided to prevent fragmentation of data memory space, leading to low memory utilization.

Embodiments of the present invention are directed to improvement of playback control of an audio/video segment, not to encoding/decoding/correction of the content in the audio/video segment. Therefore, embodiments of the invention only improve access to the navigation data. As for the audio/video segment itself and how to perform encoding/decoding/correction when playing the audio/video segment, all conventional techniques or other new technologies can be applied.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for loading data in an audio/video playback system and playing audio/video data stored in a storage medium, the audio/video data comprising a plurality of audio/video segments and a plurality of navigation data corresponding to the audio/video segments, the method comprising:

loading only a portion of a corresponding navigation data while an audio/video segment is played, wherein each set of the navigation data comprises a plurality of information tables;

calculating the required maximum memory space for the loaded navigation data;

creating a memory subspace, according to the required maximum memory space, in a memory in the audio/video playback system;

dividing the memory subspace into a plurality of address spaces; and storing each information table into the corresponding address space.

2. The method as claimed in claim 1, wherein only a portion of the video manager information, video title set information and program chain information of the corresponding navigation data is loaded.

3. The method as claimed in claim 1, wherein the loaded portion of the corresponding navigation data is capable of specifying the physical position of the audio/video segment.

4. The method as claimed in claim 3, further loading another portion of the navigation data and enabling the player corresponding to the storage medium to play the audio/video segment.

5. The method as claimed in claim 1, wherein the loaded portion of the navigation data is related to playback control.

6. The method as claimed in claim 1, wherein the loaded portion of the navigation data is used for controlling operation of the audio/video playback system; wherein the memory is irrelevant to encoding or decoding of the audio/video segment.

7. The method as claimed in claim 6, wherein each set of the navigation data comprises a plurality of information tables, the method further comprising:

calculating the required maximum memory space for the loaded navigation data;

creating a memory subspace, according to the required maximum memory space, in the memory; and storing each information table continuously into the subspace when loading a portion of the navigation data.

8. The method as claimed in claim 1, wherein the distribution of the address spaces in the memory subspace is fixed when loading portion of the navigation data.

9. The method as claimed in claim 1, further comprising:

loading a portion of a second navigation data, corresponding to a second audio/video segment, into the memory during playing the audio/video segment; wherein playback of the second audio/video segment follows the audio/video segment.

10. A chip for loading data in an audio/video playback system and playing audio/video data stored in a storage medium, the audio/video data comprising a plurality of audio/video segments and a plurality of navigation data corresponding to the audio/video segments, the chip comprising:

a processor;

a program memory for storing a program code, enabling the processor only to load a portion of the navigation data corresponding to an audio/video segment when playing the audio/video; and a data memory for storing the loaded navigation data, wherein each set of the navigation data comprises a plurality of information tables, and wherein a memory subspace in the data memory created according to the required maximum memory space for the loaded navigation data is divided into a plurality of address spaces, and each information table is stored into the corresponding address space.

11. The chip as claimed in claim 10, wherein the program code causes only a portion of the video manager information, video title set information and program chain information of the corresponding navigation data to be loaded.

12. The chip as claimed in claim 10, wherein the program code enables the loaded portion of the corresponding navigation data to specify the physical position of the audio/video segment.

13. The chip as claimed in claim 12, wherein the program code further causes another portion of the navigation data to be loaded and the player corresponding to the storage medium playing the audio/video segment.

14. The chip as claimed in claim 10, wherein the program code causes the loading of portion of the navigation data only related to playback control.

15. The chip as claimed in claim 10, wherein the program code causes the loaded portion of the navigation data to be stored in a memory in the audio/video playback system and used for controlling operation thereof; wherein the memory is irrelevant to encoding or decoding of the audio/video segment.

* * * * *